March 11, 1941. A. M. STARR Re. 21,750

INTERNAL COMBUSTION ENGINE

Original Filed Oct. 21, 1932 4 Sheets-Sheet 1

INVENTOR.
Allan M. Starr
BY Ernest G. Sweetland
ATTORNEY

March 11, 1941. A. M. STARR Re. 21,750

INTERNAL COMBUSTION ENGINE

Original Filed Oct. 21, 1932 4 Sheets-Sheet 2

INVENTOR.
Allan M. Starr
BY Ernest J. Swift
ATTORNEY

March 11, 1941. A. M. STARR Re. 21,750
INTERNAL COMBUSTION ENGINE
Original Filed Oct. 21, 1932 4 Sheets-Sheet 3
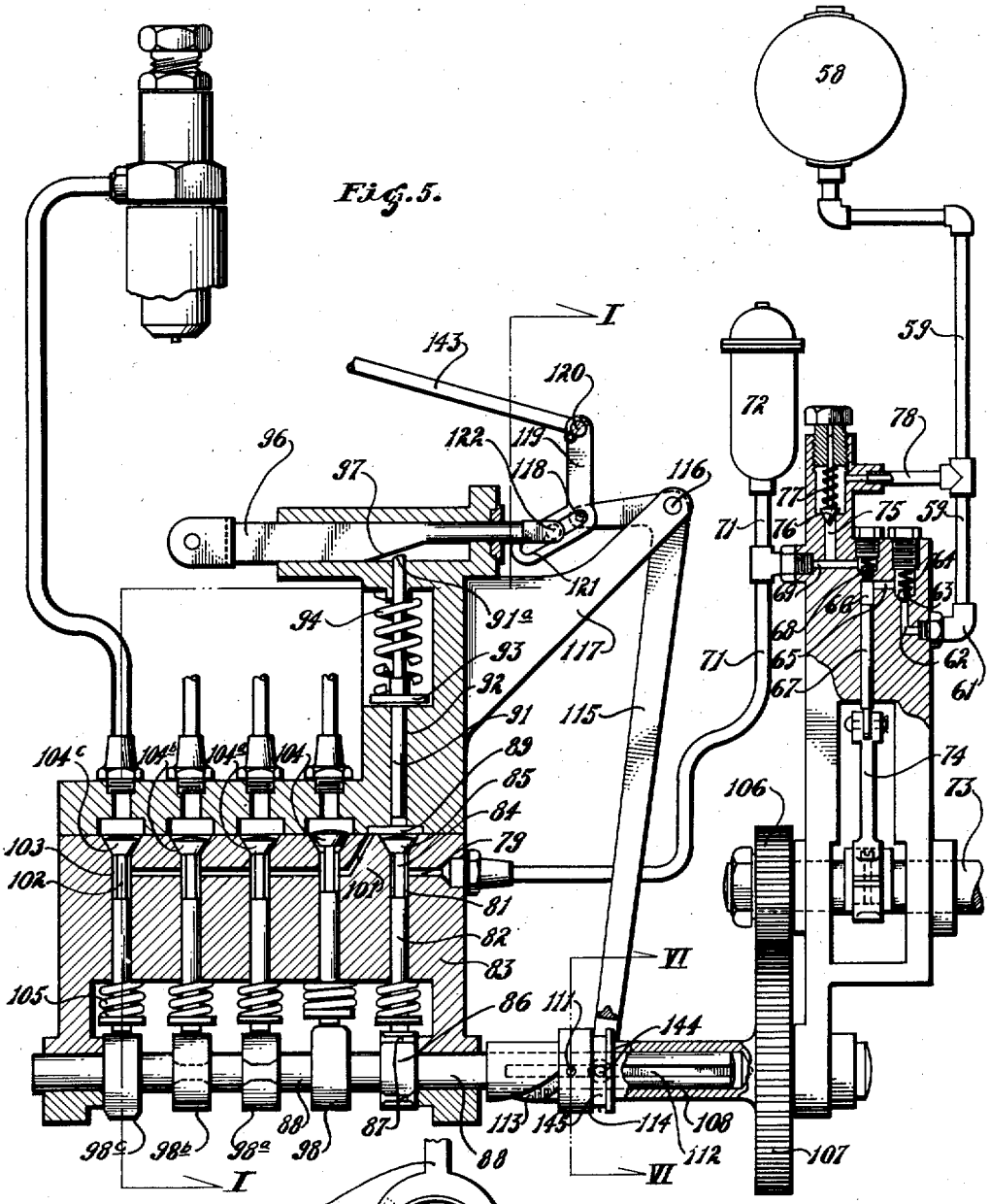
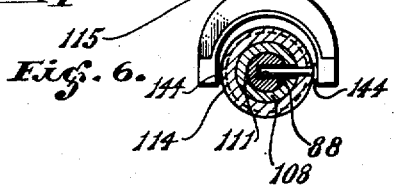
INVENTOR.
Allan M. Starr
BY
Ernest G. Sweetland
ATTORNEY March 11, 1941. A. M. STARR Re. 21,750

INTERNAL COMBUSTION ENGINE

Original Filed Oct. 21, 1932 4 Sheets-Sheet 4

INVENTOR.
Allan M. Starr
BY
Ernest J. Sweetland
ATTORNEY

Reissued Mar. 11, 1941

Re. 21,750

UNITED STATES PATENT OFFICE 21,750

INTERNAL COMBUSTION ENGINE

Allan M. Starr, Piedmont, Calif., assignor, by mesne assignments, to Starr & Sweetland, a copartnership composed of Ernest J. Sweetland and Allan M. Starr, copartners, Piedmont, Calif.

Original No. 2,025,362, dated December 24, 1935, Serial No. 638,866, October 21, 1932. Application for reissue December 17, 1937, Serial No. 180,472

12 Claims. (Cl. 123—32)

This invention relates to improvements in internal combustion engines and has for one of its objects an engine construction which utilizes the less volatile hydrocarbon fuels such as Diesel oil, and the various oils known in the trade as fuel oils, stove oil, distillate and the like, without sacrificing the speed, flexibility and light motor construction which makes an engine adaptable to the general automotive field including airplane requirements.

Another object is to provide an engine having a substantially constant air intake cycle, wherein the fuel may be throttled at will without restricting the amount of air entering the cylinder at each stroke. This is accomplished by my fuel injecting principle wherein I time the period of injection in accordance with the amount of fuel injected. This timing of the injection is so adjusted that varied amounts of fuel injected for different throttle positions are allowed to mix before ignition with substantially that portion of the air in the cylinder required to support the complete combustion of the amount of fuel injected. That is to say, at full throttle when it is desired to utilize all of the oxygen in the cylinder the injection occurs well in advance of ignition to allow time for turbulent distribution of the fuel with all the air in the cylinder, whereas at reduced throttle the fuel is injected just before ignition so that the small charge of fuel is mixed before ignition with only a small volume of air adjacent to the spark plug. By this means I obtain a constant air intake cycle and hence a high efficiency throughout the throttle range of the motor.

Another object is to provide an engine wherein the timing of fuel injection with reference to the position of the engine piston and the quantity of fuel injected at each stroke is automatically correlated.

Another object is to provide an engine of the fuel injection type wherein a portion of the residual heated gases of combustion are retained in a chamber adjacent to the cylinder and not exhausted during the scavenging stroke, nor disturbed during the intake stroke of the engine. The hot gases thus entrapped supply a heated atmosphere through which each succeeding charge of fuel is injected, with the result that the atomized fuel charge is gasified (in part at least) and is thus prepared for explosion by the spark.

A further object is to provide an engine capable of utilizing non-volatile fuel oils as an operating medium and which will, at the same time, possess the advantages of electrical ignition and consequently be capable of running at speeds unattainable with engines of the Diesel type.

Another object is to provide an engine of light construction which is capable of running on non-volatile fuels and which is capable of starting without priming and without the assistance of auxiliary machinery other than the conventional starting mechanism employed on ordinary automotive vehicle engines.

A further object is to provide an engine which, by reason of its peculiar construction, is less inclined to overheat than gasoline engines now in use and which, therefore, may more readily lend itself to air cooling.

Another object is to provide an engine head which is interchangeable with the engine head of any ordinary carburetor type of gasoline engine so that at nominal expense any gasoline operated engine can be converted to operate satisfactorily on a non-volatile flued with a resultant increase in efficiency and economy.

A further object is to provide an engine suitable for automobile, airplane and motor-boat uses wherein the necessity of a highly volatile fuel is entirely eliminated and the great fire risk which prevails particularly in airplane and motor-boat installations is practically eliminated.

Another object is to provide an engine having a combustion chamber capable of retaining heated gases therein between the strokes of the engine and in which said chamber is so equipped with a fuel injector and spark plug that atomized fuel is directed past the points of the spark plug and through the entrapped heated gases or hot atmosphere and out the open end of the chamber into the cylinder.

Another object is to provide an engine capable of operating at higher compression ratios than carburetor type engines, without detonation.

Another object is to provide an engine construction which eliminates the usual carburetor and its attendant parts and which, therefore, has a better volumetric efficiency. Such efficiency is increased by my construction because there are no restricted carburetor passages to hinder the intake air flow and because of the absence of fuel vapor in the intake air charge. By increasing volumetric efficiency more power is obtained from a cylinder of a given size.

Referring to the drawings:

Figure 5 is an enlarged view of a fuel injection system used in conjunction with the apparatus shown in the preceding figures;

Figure 6 is a sectional view taken along the line VI—VI of Figure 5; and

Figure 1:
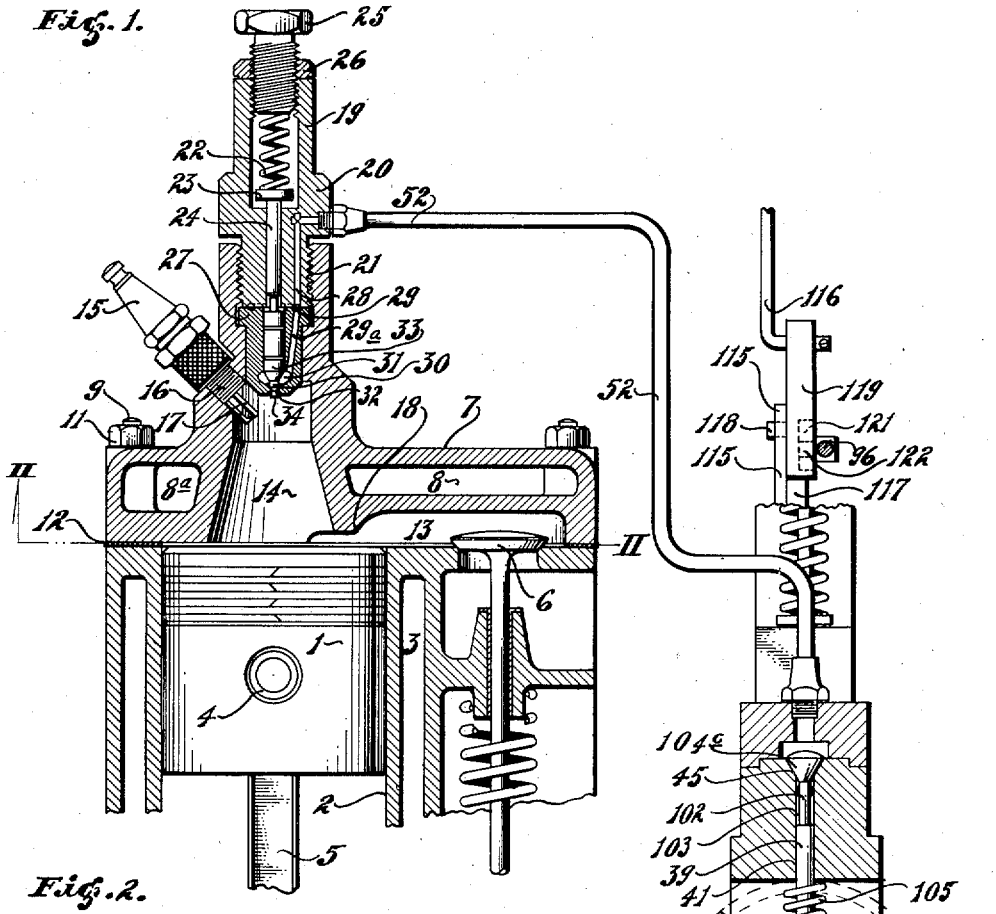
Figure 1 represents a vertical sectional view of a part of the upper portion of an engine embodying one form of my invention together with a portion of a fuel injection means for forcing fuel into the engine cylinder.

Referring to the details shown in Figure 1, the numeral 1 indicates a piston which operates in a cylinder block 2, the walls of which are cooled in the customary manner by a water jacket 3. A wrist pin 4 is secured to a connecting rod 5 in the usual manner and this connecting rod is assumed to be associated with the usual engine crank shaft, fly wheel and other parts commonly used in internal combustion engines. The valve 6 and its attendant parts are of the conventional construction employed in gasoline engines. One form of my invention, as applied to the conventional L-head motor, is illustrated in detail in the engine head of this figure wherein the head casting in general is identified by the numeral 7. Said head is cooled by a water jacket 8 and 8a, and is secured to the cylinder block 2 in the usual manner by means of the studs 9 and nuts 11 provided to draw the engine head tightly against the gasket 12. It will be noted that the engine head is recessed to form a space 13 which affords communication between the engine cylinder 2 and the exhaust and air intake valves, one of which is indicated by the numeral 6.

An important feature of my invention resides in a combustion chamber 14 formed in the engine head 7 so that it is in open communication with a cylinder bore. A spark plug 15 is mounted in a threaded opening 16 of the head and is provided with points 17 exposed within the chamber 14, and preferably located at the edge of a spray projected from a nozzle 32 associated with a fuel injector which will be more fully described hereinafter. While the chamber 14 and the space 13 are in open communication with each other it should be noted that the head casting is provided with a lip 18 which tends to deflect the air rushing into the cylinder through space 13 in a downward direction so that the incoming air produces the least possible disturbance to the hot gases entrapped in the combustion chamber 14.

Surmounting the casting which forms the main head of the engine is a fuel injector comprising a housing preferably of circular cross-sectional shape in its upper end and hexagonal at a portion indicated by the numeral 20 whereby to permit the same to be gripped by a wrench for assembly or removal. The housing 19 is secured in the head casting by the threads 21, and is hollowed out to receive a helical compression spring 22 which bears against the flattened head 23 of a rod 24. A hexagonal-headed screw 25 serves as a means for adjusting the tension of spring 22 and is held in adjusted position by a lock nut 26.

Figure 3:
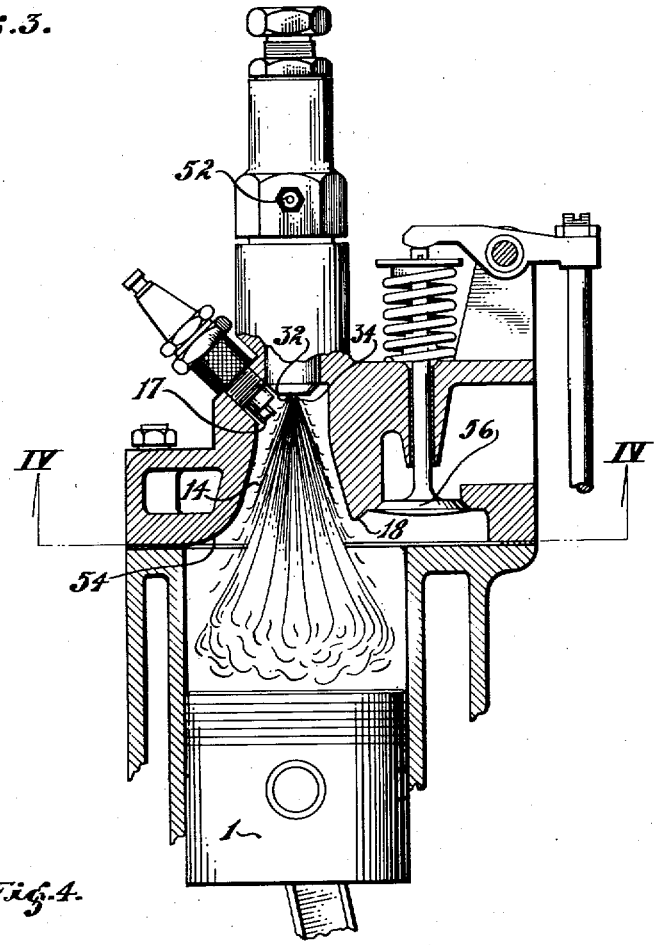
Figure 3 is a vertical sectional view of a portion of an engine of the overhead valve type embodying my invention.

The housing 19 securely holds an injector unit 27 in the position shown and in such manner that a fuel feed conduit 28 communicates with a groove 29 in the upper portion of said unit to deliver fuel through a conduit 29a into an annular space 31 and from which space the fuel is injected into the combustion chamber 14 and cylinder 2 through the pintle nozzle 32. The injector unit 27 contains a circular aperture formed along the axis of said unit. This aperture is ground to receive a plunger 33 which is also ground and lapped to form a sliding fluid-tight fit in said aperture. At the lower end of the injector unit 27 and integral therewith, and extending through the nozzle 32, is a projecting tip or pintle 34 which is preferably flared to take the form of a truncated cone having its large end lowermost. The purpose of this flaring tip is to cause the atomized fuel to discharge as a jet properly disseminating the atomized spray to promote distribution thereof in the cylinder, and at the same time giving the spray such shape and direction that it will not impinge against the walls of the cylinder. The portion 30 of the plunger 33 is ground on its lower surface to fit against a ground seat at the inner end of the opening of the nozzle 32 and acts as a valve to keep the nozzle closed except during the instant when the plunger 33 is raised by the high pressure of the fuel oil in the space 31 and which pressure occurs upon opening of the valve 104c. The angle of the pintle 34 may be varied to suit the size and shape of a given combustion chamber. For instance, if a combustion chamber such as the chamber 14 is made of a high and comparatively narrow design, the nozzle 32 and the pintle 34 are so constructed as to project the fuel in a comparatively narrow spray, but if the chamber 14 is of low wide construction, then the angle of the pintle 34 is increased to give more spread to the projected spray. In Figure 3 the injector nozzle is represented in action to give a general idea of the manner in which the fuel is projected into the part of the cylinder traversed by the piston and thoroughly mixed with the air therein. The chamber 14 may be circular or oval in cross section or of other shape to carry out the objects of the invention, the spray nozzle being constructed so as to give a jet conforming to the shape of a given chamber.

In Figure 1 the fuel for combustion is supplied by means of a pumping and metering system (not shown in this figure) which is assumed to deliver the liquid fuel under high pressure (say about 1,000 lbs. per square inch) to an annular space 103 which surrounds a valve stem 102; said valve stem being a continuation of a larger stem 39 which has a fluid-tight fit with its surrounding wall 41. At the lower end of the stem 39 is a removable collar 42 which forms a seat for a compression spring 105 which maintains the ground valve 104c against its seat 45. The lower end 46 of the valve stem 39, in its normal position, just clears the surface of a cam 48 which is caused to rotate in proper timed relation with the engine by means of a gear 49. The cam 48 is provided with a lobe 98c which at the desired point of its revolution contacts with the end 46 of the valve stem 39, overcoming the oil pressure on the valve and the downward urge of the spring 105 and lifting the valve 104c off its seat so that the pressure on the fuel system forces the column of fuel upward through the conduit 52, through conduits 28 and 29, and into the annular chamber 31, whereupon, the high pressure of the oil against the lower end of the plunger 33 overcomes the pressure of the spring 22 thereby causing the plunger 33 to rise slightly to permit a jet of atomized fuel to be very rapidly and forcibly projected through the nozzle 32. Thus, after the engine has warmed up slightly, the spray of finely atomized fuel is projected through the heated gases retained in the combustion chamber 14 and thence into the cylinder to mix with incoming air and to be later compressed and ignited by a spark produced between the spark plug points 17 in accordance with the electrical timing of the engine, which is substantially the same as the conventional timing for gasoline engines. The operation of the fuel injection system will be clearly understood by reference to the drawings and the description given further on.

Figure 2:
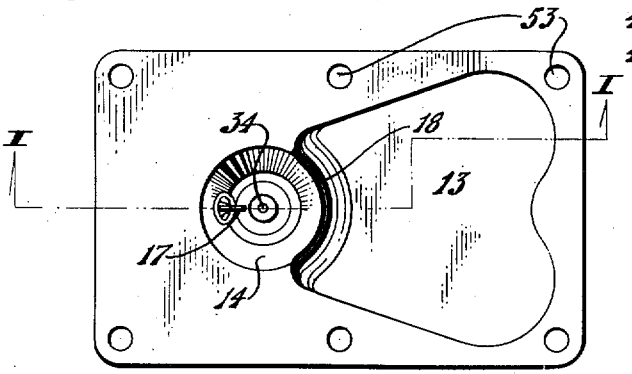
Figure 2 is an inverted plan view along the line II—II of Figure 1.

Figure 2, which is an inverted plan view taken on the line II—II of Figure 1, shows the combustion chamber 14, the spark plug points 17 and the tip of the injector nozzle 34. It also shows the chamber 13 and the lip 18 which deflects the incoming air or gases entering the cylinder; the openings marked 53 in this view being the holes through which the studs 9 pass to secure the head to the cylinder block of the engine. While Figure 2 for convenience represents the head of only one cylinder, it should be understood that ordinarily the casting 7 would extend the full length of the cylinder block and would be provided with a number of chambers and other parts corresponding with the number of cylinders in the engine.

Referring to Figure 3, this figure represents my invention applied to the ovhead valve type of motor and since the same principles would apply in the overhead valve construction as would be used in the L-head type just described, or in the T-head type of motor, the application of my invention to the overhead valve type of motor will be understood by those skilled in the art without repeating the description in minute detail. In this figure, as in the foregoing figures, the body of the engine, which may be of conventional type, as well as the exhaust manifold and other parts which have no direct bearing upon the invention, have been omitted. It is clear that the overhead valve construction permits the intake and exhaust valves to be placed closer to the combustion chamber and thus enables a reduction in volume of the compression space inherently required in order to extend the head over the valves of an L-head engine. This enables an overhead valve motor to be designed to afford more space for combustion in the chamber 14 than would be practical in an L-head motor of the same size.

The sleeve valve type of motor lends itself particularly well to my invention since all the compression space may then be utilized for chamber 14, but it has not been deemed necessary to illustrate the sleeve type motor in this application as the principles for applying my invention to the sleeve valve motor would be substantially the same.

In Figure 3, the piston 1 is represented as being in progress in its upward compression stroke and the fuel is represented as being discharged from the nozzle 32 in a conical jet having diverging sides which form an angle such that the jet clears the walls of the chamber 14 but flares outwardly below said walls to enable said fuel to mix thoroughly with the charge of air which is rapidly being compressed. A notable feature of the chamber 14, in the modified form illustrated in this figure, resides in the curved flaring of its walls in the zone where the chamber meets with the space at the top of the cylinder, as indicated at the point 54. I have found that a streamline effect is produced by the curvilinear walls defining chamber 14 and that this has an advantageous effect in that it facilitates turbulent mixture of the injected fuel and the air. It is within the province of my invention to vary the curvature of the walls of the chamber 14 or to employ any angle of flare for said walls that may be best suited to carry out the objects of my invention.

While in Figure 3, as well as in Figure 2, I have illustrated the spark plug in a certain position with reference to the chamber 14, I do not limit myself to the particular position shown and it is within the scope of my ivention to use more than one spark plug within each chamber if desired and to use such modified forms of spark plug or other electrical ignition apparatus as may be desired and to locate them in any position that will produce an explosion of the charge by an electrical spark.

Figure 4:
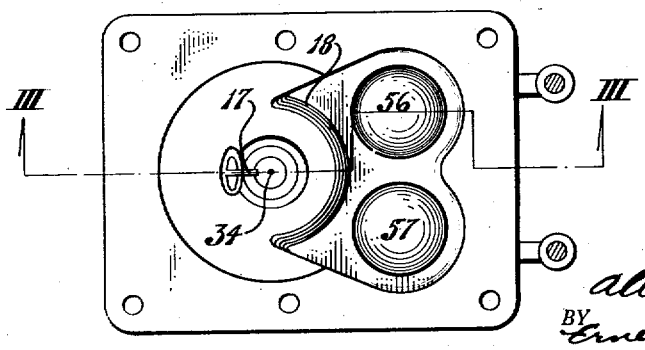
Figure 4 is an inverted plan view along the line IV—IV of Figure 3.

Figure 4 is an inverted plan view of the engine head represented in Figure 3 taken along the line IV—IV thereof. In this figure, the exhaust valve is designated by the numeral 56 and the intake valve (not shown in Figure 3) by the numeral 57. The spark plug points are represented by the numeral 17 and the nozzle tip by 34.

Figure 5 illustrates a fuel injection system that I may employ in carrying out the objects of my invention. In this figure, 58 represents a fuel supply tank from which a pipe 59 conducts the fuel to a fitting 61, from whence it passes into a conduit 62, past a ball check valve 63 which is held on its seat by a spring 64, through a conduit 65 and into a pump cylinder 66. The fuel is forced from said cylinder by a piston 67, past a discharge ball check valve 68, through a conduit 69, into a pipe line 71 which, at its upper end, is connected to a fluid pressure chamber 72. This pressure chamber is designed to be maintained full of fuel oil under high pressure, say about 1,000 lbs. per square inch. The chamber 72 is formed by metallic walls possessing sufficient elasticity to act as a cushion and absorb the pulsations induced by reciprocation of the pump piston 67 and maintain a substantially uniform hydraulic pressure at the lower end of the fuel line 71. The pump piston 67 is connected to one end of a connecting rod 74 and the opposite end of said rod is connected to a shaft 73 which may be connected with the engine crank shaft (not shown).

In order to maintain the desired pressure in the chamber 72, the fuel pump is designed to be capable of pumping such quantity of oil as will meet the maximum fuel requirements of the engine. When the engine is not operating under full load, surplus fuel pumped by the piston 67 is by-passed and is returned to the supply line 59 through a conduit 75, which is controlled by a check valve 76 loaded by the pressure of a compression spring 77 so as to maintain the desired pressure in the chamber 72, the fuel pipe 71, and a pipe 78.

The fuel pumped into the pipe 71 passes through a conduit 79 and thence into an annular space 81 formed by reducing the upper end of a valve stem 82 as indicated at 84. The lower portion of the valve stem 82 has a ground and fluid-tight sliding fit in a block 83. At the extreme upper end of the valve stem 82 is a valve element 85 which has a face ground to provide a close fit with a conical seat in the block 83. The valve element 85 is actuated by a cam 86 which engages the lower extremity of the valve stem 82. In the present disclosure, a four cylinder engine is shown as illustrative and, accordingly, the cam 86 is assumed to have four lobes, one for each cylinder. Two of said lobes are shown in Figure 5 and indicated by the numeral 87. The cam 86 is secured to a cam shaft 88, whereby for one revolution of the cam shaft 88 the valve 85 will be lifted four times by the four lobes 87. Or in other words, once for each charge of fuel required by the respective cylinders of the engine.

In order to control the quantity of fuel delivered to the engine in accordance with variations demanded by changes in load and speed, I provide a fuel governor means (Fig. 5) including a chamber 89 formed in a block 92. This chamber communicates directly with a bore for a rod 91, and the rod 91 is ground and lapped to provide a sliding, fluid-tight fit in said bore. The rod 91 carries a collar 93 against which a stiff compression spring 94 is seated. From this construction, it will be apparent that the rod 91 is free to move in an upward direction when the fuel enters the chamber 89 under sufficient pressure to overcome the pressure of the spring 94. When this occurs, however, the upward travel of the rod 91 is limited by the position of a slide 96 which acts as a throttle by which the flow of fuel to the engine is governed. This slide is provided with an inclined surface 97 that acts as an abutment against which the upper end 91[a] of the rod 91 strikes when the pressure in the chamber 89 forces said rod upwards.

When the engine is idling at its slowest speed, the slide 96 is in its forward position, and the inclined surface 97 is spaced slightly from the upper extremity 91[a] of the rod 91 to thereby allow said rod to move vertically this very slight distance against the action of the spring 94. If it is desired to speed up the engine, then the slide 96 is retracted or moved to the left relatively to the block 92, and the rod 91 is permitted a relatively greater movement equal to the distance or clearance then existing between the end 91[a] and the face of the inclined surface 97. In this manner the volume of fuel, which is allowed to pass the valve 85 at each contact of the lobes 87 of the cam 86 with the lower end of the stem 82, is definitely regulated by the position of the slide 96, or throttle as it may be called. Thus, when the valve 85 is lifted to admit a charge of fuel into the chamber 89, the rod 91 is caused to rise vertically under the high pressure of the fuel. Obviously, when the valve 85 is closed the rod 91 will bear against the fuel with a pressure equivalent to the force exerted by the spring 94 divided by the area of the rod 91. Accordingly, a definite, measured charge of fuel is held under pressure in readiness to be discharged through a given injector nozzle into a given cylinder of the engine as soon as a given valve controlling the fuel supply to said injector nozzle is opened. When said valve is opened, the spring 94 forces the rod 91 down to the limit of its travel, thereby forcing the oil charge from the chamber 89 into the cylinder, as will be clear from the following.

Leading from the chamber 89, Figure 5, is a conduit 101 which connects said chamber with annular spaces 103 below valves 104, 104[a], 104[b] and 104[c], respectively. These annular spaces surround the stems associated with said valves and are maintained full of fuel in readiness to be discharged through an associated injector nozzle when one of the valves 104 or 104*a*, etc. is lifted from its seat. These valves are normally held closed by compression springs 105 and are actuated or opened by cams 98, 98[a], 98[b] and 98[c], respectively, which have one lobe each positioned in accordance with the timing of the engine. Said cams are carried by the same cam shaft 88 which carries the four-lobed cam 86 already referred to. The lobes 87 on the cam 86 are angularly positioned relative to the lobes on the cams 98, 98[a], 98[b] and 98[c] so that when the valve 85 is open the valves 104, 104[a], 104[b] and 104[c] are all closed and remain closed until after the valve 85 is closed. With this arrangement, it will be obvious that as the cams 98, 98[a], 98[b] and 98[c] lift the valves 104, 104[a], 104[b] and 104[c] in their firing order, a charge of fuel is released under sufficient pressure to lift the plunger 33 of an associated injector and thereby cause a forcible injection of atomized fuel into each cylinder in its turn; it being understood that the compression springs 105 and the oil pressure above the valves are sufficient to hold said valves firmly on their seats until they are lifted in predetermined order by the cams 98, 98[a], 98[b] and 98[c]. One of the fuel injectors is diagrammatically shown in this figure to illustrate the relationship between the several injectors of an engine and the fuel feed system, it being understood, of course, that the valves 104, 104[a], 104[b] and 104[c] each control the fuel supply to a different injector.

I may vary the fuel system in many ways. For instance, the valves of the 104 series may be placed radially about a central cam or cams. Also, the springs 105 may be located at the top of the valves instead of below them; or under certain conditions, the springs may be omitted, as when the oil pressure on the top of the valves keeps them seated by virtue of a differential in pressure on opposite sides of said valves.

The fuel feed system, as a whole, is operated by the shaft 73 which is assumed for the sake of illustration to be connected with the engine crank shaft. A gear 106, which is fixed to the shaft 73, causes a meshing gear 107 to rotate. The gear 107 is provided with a hollow extended hub 108 and imparts rotary motion to the fuel system injector cam shaft 88 by means of a pin 111 fixed in a collar 114 slidably mounted on the hub 108. The pin 111 extends radially inwardly from the collar 114, through a helical aperture in the hub 108, and terminates in a straight groove 112 cut in the shaft 88. Thus the pin forms a driving connection between the hub 108 and shaft 88. With this connection, it is possible to alter the angular position of the shaft 88 relative to the hub 108 and while both are rotating, by simply moving the pin 111 to or fro relative to the grooves 112 and 113. Since the pin 111 is secured rigidly in the rotating collar 114, its position in said grooves can be controlled by shifting the collar 114 on the hub 108. Such shifting is achieved through a forked arm 115 carrying trunnions 144 which ride in a groove 145 in the collar 114. With the above mechanism, the timing of the injection of the fuel charges with respect to any angular position of the engine crank shaft can be changed at will while the engine is running.

Figure 7:
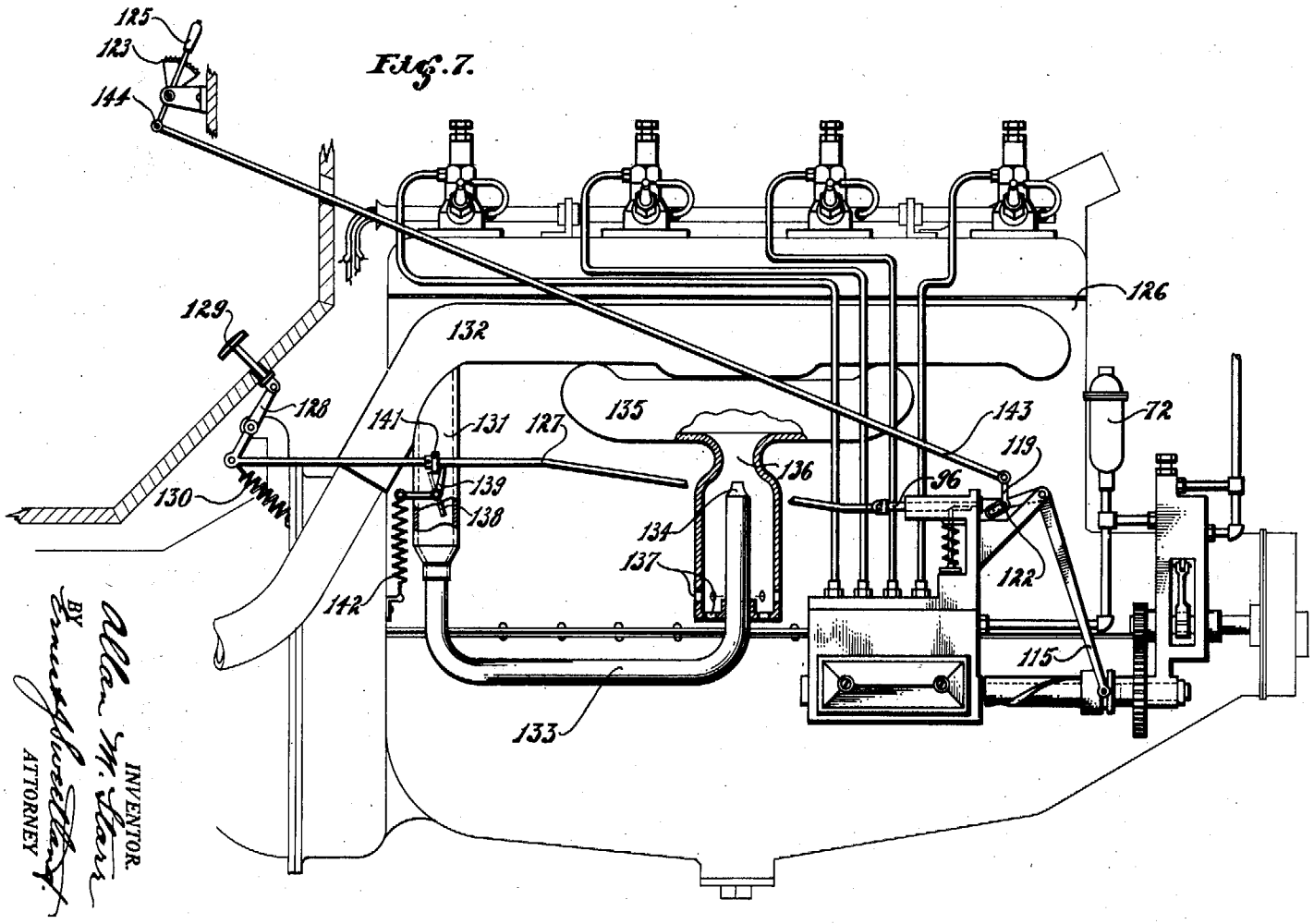
Figure 7 is a side elevation of an engine assembly wherein my invention is utilized.

The forked arm 115 is pivotally mounted upon a bracket 117 by a pin 116. An extension of the arm 115 is connected to an intermediate portion of a link 119 by means of a pin 118 which projects from one side of said link. One arm of the link 119 contains a slot 121 which is not cut clear through link 119 but is deep enough to operatively receive a pin 122 carried by the slide 96. A rod 143 is pivotally connected at one end to the link 119 by a pin 120 and its opposite end to a lever 125 by a pin 144. The lever is mounted so that it can be set at any desired position relative to a segment 123 (Fig. 7). Movement of the rod 143 by manipulation of the lever 125 will rotate the link 119 about the axis of the pin 118 and such rotation will change the angle of the slot 121 relative to the horizontal line of travel of the slide 96 and tend to shift the slide 96 bodily. The force tending to move the slide 96 horizontally has a vertical component which, since the link 119 is held firmly by rod 143, causes the arm 115 to rotate about the pin 116 and thereby move the collar 114 along the hub 108 and alter the injection timing. When the collar 114 is in its right hand position, i. e., nearest to the gear 107, the injection begins at the end of the compression stroke (retarded injection) and when the collar 114 is in its extreme left hand position the injection begins at the start of the air intake stroke (advanced injection). Therefore, moving the slide 96 to the right reduces the amount of fuel injected for each charge and retards or delays the beginning of injection; whereas moving said slide to the left increases the amount of fuel injected for each charge and advances the beginning of injection. When the throttle is in idling position, the slide 96 is in its right hand position; the pin 122 is at the end of the slot 121 adjacent the pin 118; and the arm 115 is swung to retard the injection period so as to make it practically simultaneous with the timing of the spark. If the rod 143 were moved at this time there would be no consequent movement of the arm 115 because the link 119 would merely rotate about its pivot pin 118 inasmuch as the axis of the pin 122 substantially coincides with the axis of the pin 118. Therefore, the retarded position of the arm 115 is not changeable by movement of the rod 143 when the throttle is in idling position. However, when the pin 122 is moved by the throttle slide 96 so that its axis no longer coincides with that of the pin 118 (as shown in Figure 5) there must be a corresponding movement of the arm 115, the degree of movement depending upon the extent to which the slot 121 has been inclined. That is to say, if the slot 121 were horizontal the fuel injection system would remain with retarded timing regardless of the throttle position, and if the slot were inclined about as shown in Figure 5 the fuel injection system would be fully advanced at full throttle. Moreover, if the slot 121 were further inclined just a degree or so the timing of the fuel injection system would be advanced a correspondingly small amount at full throttle.

In considering the movement of the link 119 and the arm 115 produced by the pin 122, it should be remembered that when the lever 125 is locked in position relative to the segment 123 (Fig. 7) the rod 143 can still pivot about the pin 144 carried at the lower end of said lever. To this extent, rod 143 is always free to move, and it will be noted that it must so move when the arm 115 is actuated by movement of the throttle slide 96. It is within the province of my invention to make the slot 121 or the surface 97 curved instead of straight so that the timing of injection is suitable for any setting of the throttle, which is one object of my invention. In this way, the desired control is obtained and it is possible to make adjustments for various operating conditions so that any change in the throttle position will be accompanied by the most desirable change in the timing of the fuel injection.

The rod 143 is adjusted to give the best motor performance under various operating conditions. When starting a cold motor, the full throttle position is used in which the injections occur simultaneous with the creation of the ignition spark (slot 121 is here set horizontal). Under these conditions I find that the heat of compression during the cranking or mechanical starting of the engine is sufficient to enable the spark plug to ignite the charge to create at least a weak explosion, after which the hot gases from the explosion tend to volatilize succeeding charges of fuel and thus the operation continues. With a full throttle and low engine speed (lugging) the time of injection may be advanced to begin during some part of the compression stroke, while with a full throttle and high engine speed the injection may be advanced to begin during the air intake stroke. The type of fuel as well as the construction and compression ratio of the motor are also factors which determine the setting of the rod 143. In general, the more volatile the fuel, or the less its tendency to detonate, the further it may be injected in advance of its ignition.

A desirable characteristic found in the operation of the described fuel system is that with the throttle set in a given position the amount of fuel delivered for each injection decreases as the engine speed increases and vice versa. The shape of the cams and the size of the valves and passages determine the degree to which the amount of fuel injected is affected by speed changes. The viscosity of the fuel also determines the extent to which speed changes alter the amount of fuel injected; and since fuels may vary in viscosity it is within the province of my invention to provide a needle valve (not shown) in the line 71 to regulate the resistance which the system offers to fuel flow and thus maintain the proper relation for the change in the amount of fuel injected as a result of changes in speed. Such a valve may be linked to the throttle mechanism or controlled by a governor for purposes of varying the resistance in the fuel line to meet special operating conditions.

It should be understood that the advance of the timing of the injector mechanism, which results in the advance of the timing of the actual injection, as heretofore referred to, has a dual purpose; one is to adjust the timing of the injector to compensate for time lag, especially at high speed, and the other is actually to advance the period of injection with reference to the crank angle.

Referring to Figure 7, a conventional engine block 126 is illustrated equipped with the head mechanism and fuel system which form the subject-matter of this invention. A sufficient number of the parts shown in the figures heretofore described have been here correspondingly marked with reference numerals to enable the parts to be readily identified. Figure 7 assumes the engine to be installed in an automotive vehicle wherein the throttle slide 96 is connected by a rod 127 to a lever 128 which is controlled by a foot pedal 129, a spring 130 acting to return the throttle slide to the idling position whenever the foot pressure on the pedal 29 is released. Said figure illustrates a feature of my invention which I have found advantageous under certain conditions, namely, that of diverting a portion of the exhaust gases back into the cylinders during idling of the engine. I have found that under some conditions, when the engine is idling very slowly, the engine block tends to cool off to a greater extent than is desirable and that operating conditions are improved by letting some of the exhaust gases return to the cylinders to be introduced with the cold air in lieu of introducing cold air alone. I accomplish this object by providing a branch pipe 131 which connects with an exhaust manifold 132 and leads into an intake manifold 135 through a pipe 133 and nozzle 134 which is directed into said intake manifold through an opening 136 where the heated gases mix with the relatively cold air drawn into the intake manifold through the openings 137. While it may be desirable to introduce some of the heated gases in the cylinders while idling at slow speeds, it is not desirable to admit such gases when the engine is carrying appreciable load. I have, therefore, arranged the mechanism shown so that, as soon as the throttle is slightly opened, and the engine is given an increased fuel charge, the inflow or exhaust gases to the cylinder is automatically shut off. This is accomplished by means of a butterfly valve 138 which is here shown in open position. This valve is carried by a shaft to which is secured a ball crank 139 having an upwardly extending arm which is caused to bear against a collar 141 by means of a spring 142. The collar 141 is secured to the rod 127 and as the pedal 129 is pushed downwards to open the throttle the rod 127 is moved toward the left and the tension on the spring 142 is relieved whereby to close the butterfly valve 138. When it is desired to obtain the quietest and smoothest possible operation at idling speeds, a butterfly valve may be placed in the air intake manifold 135 and operated in conjunction with the throttle lever, similar to the manner shown in connection with the butterfly valve 138. By this means the vibrations caused by full compression at idling speeds is eliminated.

The perfect operation of my engine is attained by a combination of various related devices. The cylinder head construction provides the entrapped hot atmosphere through which each charge of fuel is sprayed before it is ignited and burned. It is by this construction that my engine is capable of using the less volatile fuels successfully. The method of feeding fuel to the engine provides for correlation of the amount of each charge of fuel sprayed into the cylinder with the extent of the engine's piston travel during which the fuel is injected. It is by this method of feeding fuel in combination with my cylinder head construction that it is possible to attain the extensive speed range and high engine speed as well as the economy of the constant air intake cycle of my engine.

When the engine is to develop its full power, the fuel is sprayed into the cylinder as the air is rushing in during the intake stroke and consequently all this air is uniformly mixed with the proper amount of fuel so that complete combustion of the fuel is obtained. Thus, prior to compression, an explosive mixture completely fills the engine cylinder. When the engine is to run at reduced throttle it is clear that there is more air in the cylinder than is required to combust the small fuel charge injected, and if this small amount of fuel were to mix with all this air the consequent mixture would be so lean that it could not explode. The fuel injection system of my engine is so designed that by the time ignition is to occur the reduced fuel charge has mixed or is mixing with substantially that portion of the air in the cylinder required for the complete combustion of the particular quantity of fuel injected. My fuel injecting system accomplishes this by injecting the small fuel charge at a time which just precedes, or is simultaneous with, its time for ignition. For any throttle position, the injection period is properly timed to allow the fuel to mix with the amount of air before combustion. While I have illustrated one means of correlating the fuel throttle 96 with the cam shaft 88 controlling the injection timing, I do not limit myself to the arrangement shown, for the same object may be carried out by various other arrangements of levers and cams, or by an arrangement of planetary gears to take the place of the helical slot 113 and its attendant parts.

It should be especially noted that my engine is capable of operating to advantage on gasoline or the like as well as the non-volatile fuel oils.

I do not limit myself to the precise construction of cylinder heads shown in the accompanying drawings inasmuch as the central axis of the chamber 14 may or may not be on the extended central axis of the cylinder bore as shown. Moreover, the chamber 14 may be placed on one side of the top of the cylinder bore and inclined so that the fuel charge may be directed toward the center of the piston head. The chamber 14 may be given any shape conforming with the shape of the spray from any injector nozzle. I prefer to have the volume of the chamber 14 equal to at least one-third of the total volume of the compression space.

The fuel nozzle used may be of any construction that will atomize oil by the use of compressed air as well as the solid injecting principle shown. The spark plug may be of the present design illustrated or any modification thereof and I may combine the injector and properly arranged electrodes as a unit. If desired, the electrodes may be arranged at the mouth of the fuel nozzle in such a way that the electric discharge passes directly through the fuel jet issuing from the injector. I may provide means outside the engine to adjust the position of the electrodes within the chamber 14, and it is within the province of my invention to provide such adjustment.

I am aware that various forms of antechambers or combustion chambers have been used in connection with Diesel engines but the use of such chambers has been for purposes other than those herein described, and not for the purpose of entrapping therein heated residual gases to be utilized for heating an atomized spray of fuel during the unrestricted passage of such spray through the chamber into the displacement space of the engine well in advance of ignition by a spark.

I also am aware that whatever may be the shape of the compression space adjacent to an engine cylinder, such space contains hot gases not removed at the end of the exhaust stroke and also contains gases heated by compression at the end of each compression stroke, but the presence of these hot gases has no bearing upon the present invention. In the first place, residual exhaust gases in an ordinary compression space are dissipated by and intermixed with the intake air, rendering them ineffective for the purpose herein described. In the second place, gases heated by compression alone become hot only toward the very end of the compression stroke and hence are ineffective for carrying out the objectives of my invention. With my cylinder head construction, a hot atmosphere is continually present in chamber 14. Even when the engine is running with a light load and the exhaust is relatively cool it should be noted that the explosions are localized in chamber 14 and the hot gases from each explosion tend to remain in this chamber while the cooler intake and exhaust gases flow in and out of the cylinder. Hence, if a heavy load is suddenly placed upon the engine, this hot atmosphere is present to heat the consequent larger charge of fuel regardless of the engine piston's position when the injection begins. Since the gases in chamber 14 are hotter than the gases in an ordinary cylinder head before compression occurs, it is obvious that after compression and ignition, the gases in the upper end of chamber 14 will attain a temperature considerably higher than in an ordinary cylinder head. It is the presence of gases at this high temperature in the upper part of chamber 14 which enables the ordinary electrical ignition system to efficiently ignite fuel oil for all operating conditions of the engine.

In Figures 1 and 3 it will be noted that the fuel injecting nozzle 32 and its attendant parts project to a certain extent into the chamber 14. This tends to cause considerable heat from the burning gases to be transferred to the nozzle casing 19 and the fuel oil which it contains, thus facilitating more complete vaporization of the fuel oil when it is sprayed into intimate contact with the hot gases in the chamber 14. It is within the province of my invention to extend this nozzle into chamber 14 to any desired extent, in fact, I may so extend the nozzle casing into the chamber 14 that it will be jacketed by hot gases to a considerable extent. Whatever length or shape of injection nozzle I may employ I have found that it is always desirable to direct the nozzle toward the interior of the displacement part of the cylinder and not against the walls of the cylinder and its associated parts.

I reserve the right to apply the principles herein described to any type of motor to which they are applicable, such as the V type and the radial or rotary types etc., whether of the two cycle or four cycle design.

Where the term "throttle" is used in this specification it is intended to mean any device for varying the quantity of fuel fed to the engine and is not necessarily limited to the particular means herein set forth.

Where I use the term "hot gas chamber" I refer to a special chamber designed to entrap a portion of the hot gases of combustion and retain the same in such manner that they are not exhausted during the scavenging stroke of the engine nor mixed to any great extent with the air which rushes into the cylinder during the intake stroke of the engine.

Where I use the term "compression space" I refer particularly to the space in the cylinder head adjacent to the engine cylinder wherein gases are fully compressed when the piston is at the top of its stroke.

By "displacement part" of a cylinder I mean that part of a cylinder which is traversed by the piston as distinguished from any space in the upper portion of the cylinder that is not reached by the piston in its normal travel.

When I use the term "non-volatile" fuel I mean a fuel that does not evaporate rapidly at normal atmospheric temperatures, as distinguished from volatile fuels such as gasoline or alcohol.

Where I use the term "electrical ignition" I mean ignition from periodic electric discharges such as those which cause sparks and in no way do I mean ignition from a wire heated by a continuous electrical flow.

What I claim is:

1. An internal combustion engine including a cylinder head, a cylinder and piston, an elongated combustion chamber in said cylinder head, an inlet passage in said head leading downwardly and directly into said cylinder, said inlet passage being adjacent said combustion chamber and separated therefrom by a partition member constructed with a deflecting lip to direct the incoming air charge into the engine cylinder and away from the combustion chamber, said combustion chamber having communication with said cylinder and having a quiescent zone in the end remote from said cylinder wherein a minimum of turbulence is produced, an injector nozzle and electrical ignition means in said zone, said nozzle being positioned to direct its spray adjacent said ignition means within said zone and substantially toward said cylinder and piston.

2. An internal combustion engine construction comprising a cylinder and a cylinder head, an elongated combustion chamber in said cylinder head, a quiescent zone formed in the portion of said combustion chamber most remote from said cylinder, a fuel injection nozzle in said chamber located to direct a spray of fuel through said quiescent zone and chamber and substantially toward said cylinder, a spark mechanism in said chamber having a spark gap adjacent the opening in said nozzle, a downwardly-leading air intake passage formed in said cylinder head adjacent said combustion chamber, a partition member in said cylinder head between said combustion chamber and said air intake passage having a portion which serves to deflect the incoming air away from said combustion chamber and toward said cylinder.

3. An internal combustion engine construction comprising a cylinder and a cylinder head, an elongated substantially vertically disposed combustion chamber in said head, said chamber being of reduced cross-sectional area at the end most remote from said cylinder and gradually increasing in cross-sectional area toward said cylinder, an injector nozzle located to direct a spray of fuel through said combustion chamber toward said cylinder, a spark plug in said chamber having a spark gap adjacent the outlet of said nozzle, a downwardly-leading air intake passage in said cylinder head adjacent said combustion chamber, a downwardly opening air valve to control said passage, a partition member in said cylinder head between said combustion chamber and said air intake passage having a portion which serves to deflect the incoming air away from said combustion chamber and toward said cylinder.

4. An internal combustion engine including a cylinder head, a cylinder and piston, a combustion chamber in said cylinder head, said combustion chamber being elongated upwardly and having its walls converging toward the end most remote from said cylinder to produce a quiescent zone of comparatively little turbulence at the end of said chamber most remote from said cylinder, a fuel injection nozzle in said quiescent zone located to direct a spray of fuel through said quiescent zone and combustion chamber substantially toward said cylinder, a spark gap in said quiescent zone adjacent said nozzle, a downwardly-leading air intake passageway in said cylinder head, separating means between said air intake passageway and said combustion chamber, said separating means including a lip member acting to deflect the intake air downwardly into said cylinder and prevent said intake air from directly entering into said combustion chamber.

5. An internal combustion engine including a cylinder head a cylinder and piston, intake and exhaust passageways in said cylinder head, engine-timed valves mounted in said cylinder head to control said passageways, a combustion chamber in said cylinder head, said chamber being elongated upwardly to provide a quiescent zone in the end thereof most remote from said cylinder, a fuel injection nozzle in said quiescent zone located to direct a spray through said quiescent zone and combustion chamber substantially toward said cylinder, a spark gap in said quiescent zone adjacent said nozzle, the said air intake passageway leading downwardly through said cylinder-head into said cylinder, and being separated from said quiescent zone and said combustion chamber by a wall having a deflecting lip which deflects the incoming air downwardly into said cylinder and prevents direct entrance thereof into said combustion chamber and said quiescent zone.

6. An internal combustion engine construction comprising a cylinder and a cylinder head, an elongated combustion chamber in said head, said chamber being of reduced cross-sectional area at the end most remote from said cylinder, an injector nozzle located to direct a spray of fuel through said combustion chamber toward said cylinder, a spark plug in said chamber having a spark gap adjacent the outlet of said nozzle, a downwardly leading air intake passage in said cylinder head adjacent said combustion chamber, a downwardly opening air valve to control said passage, a partition member in said cylinder head between said combustion chamber and said air intake passage having a portion which serves to deflect the incoming air away from said combustion chamber and toward said cylinder.

7. An internal combustion engine including a cylinder head, a cylinder connected to said cylinder head, a piston in said cylinder, said cylinder head having an elongated combustion chamber formed therein, an air inlet passage operatively arranged with respect to said combustion chamber and in communication with said cylinder, said cylinder head being provided with an air deflecting lip to direct incoming air downwardly into said cylinder, said combustion chamber having communication with said cylinder and having a quiescent zone in the end thereof remote from said cylinder wherein a minimum of turbulence is produced, and an injector and electric ignition means in said quiescent zone, said injector nozzle being positioned to direct its spray adjacent said ignition means and substantially toward said cylinder and piston.

8. An internal combustion engine construction comprising a cylinder and a cylinder head, an elongated combustion chamber in said head, said chamber being of reduced cross-sectional area at the end most remote from said cylinder and being arranged and constructed so that gaseous material can enter said chamber only through its end adjacent said cylinder, whereby to provide a quiescent zone in said chamber, an injector nozzle located to direct a spray of fuel through said combustion chamber toward said cylinder, a spark plug in said chamber having a spark gap adjacent the outlet of said nozzle, downwardly opening air intake passage in said cylinder head adjacent said combustion chamber, an air valve to control said passage, a partition member in said cylinder head between said combustion chamber and said air intake passage, one side of said partition member forming a wall of the combustion chamber and the other side a wall of the air intake passage and serving to deflect the incoming air away from said combustion chamber and toward said cylinder.

9. An internal combustion engine construction comprising a cylinder, a cylinder head, said cylinder head having an elongated combustion chamber formed therein, said combustion chamber being in direct communication with said cylinder and being arranged and constructed so that gaseous material can enter said chamber only through the end thereof communicating with said cylinder, said combustion chamber also having a portion of the walls defining the same converging in a direction away from said cylinder to form a quiescent zone, an injector nozzle having an outlet in said combustion chamber arranged to direct a spray of fuel through said quiescent zone and combustion chamber toward said cylinder, a spark plug carried by said cylinder head having a spark gap adjacent the outlet of said nozzle, an air intake passage operatively arranged relative to said combustion chamber for admitting charges of air into said cylinder, an air valve controlling the admission of said charges of air, and an air deflecting wall interposed between said combustion chamber and said air intake passage for deflecting the incoming air downwardly into said cylinder, said wall having at least a portion of a seat for said air valve formed thereon.

10. An internal combustion engine construction comprising a cylinder and a cylinder head, an elongated combustion chamber in said head, said combustion chamber being in direct communication with said cylinder and being arranged and constructed so that gaseous material can enter said chamber only through the end thereof communicating with said cylinder, whereby to provide a quiescent zone in said chamber, an injector nozzle having an outlet in said combustion chamber located so as to direct a spray of fuel through said combustion chamber toward said cylinder, a spark plug carried by said cylinder head having a spark gap in said combustion chamber adjacent the outlet of said nozzle, an air intake passage operatively arranged relative to said combustion chamber, an air valve controlling the egress of air from said air passage, and a wall in said cylinder head, said wall being arranged and constructed to serve the dual purpose of deflecting incoming air and fuel into said cylinder.

11. An internal combustion engine including a cylinder head, a cylinder connected to said cylinder head, a piston in said cylinder, said cylinder head having an elongated combustion chamber formed therein arranged and constructed so that gaseous material can enter said chamber only through its end adjacent said cylinder, a downwardly leading air inlet passage operatively arranged with respect to said combustion chamber and adjacent thereto and in communication with said cylinder, said cylinder head being provided with a partition member between said intake passage and said combustion chamber, a downwardly opening valve to control said passage, a seat for said valve a portion of which is located upon said partition, the portion of said valve seat which is located upon said partition being formed at an angle to direct incoming air directly into said cylinder, said combustion chamber having a quiescent zone in the end thereof remote from said cylinder wherein a minimum of turbulence is produced, and an injector nozzle and electric spark ignition means in said quiescent zone, said injector nozzle being positioned to direct its spray adjacent said ignition means and substantially toward said cylinder and piston.

12. An internal combustion engine construction comprising a cylinder and a cylinder head, said cylinder head having an elongated combustion chamber formed therein, said chamber being of reduced cross sectional area at the end most remote from said cylinder and being arranged and constructed so that gaseous material can enter said chamber only through its end adjacent said cylinder, whereby to provide a quiescent zone in said chamber; an injector nozzle in said chamber positioned to direct a spray of fuel through said chamber toward said cylinder; a spark plug in said chamber having a spark gap adjacent the outlet of said nozzle; a downwardly leading air intake passage in said cylinder head adjacent said combustion chamber; a downwardly opening air valve to control said passageway; and means in said cylinder head separating said combustion chamber from said air intake passage arranged and constructed to direct the incoming air downwardly into said cylinder.

ALLAN M. STARR.